United States Patent
Sluiman et al.

(10) Patent No.: US 7,316,004 B2
(45) Date of Patent: Jan. 1, 2008

(54) ORGANIZATION OF TEST CASES

(75) Inventors: Harm Sluiman, Scarborough (CA); L. Marcelo Paternostro, Markham (CA)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 10/294,994

(22) Filed: Nov. 14, 2002

(65) Prior Publication Data
US 2003/0126586 A1 Jul. 3, 2003

(30) Foreign Application Priority Data
Dec. 27, 2001 (CA) .................................. 2366344

(51) Int. Cl.
*G06F 9/44* (2006.01)
(52) U.S. Cl. ...................... 717/125; 717/115; 717/118; 717/128; 717/131
(58) Field of Classification Search ................ 717/124, 717/125, 126, 131, 127, 115; 714/31, 32
See application file for complete search history.

(56) References Cited

U.S. PATENT DOCUMENTS

| | | | | |
|---|---|---|---|---|
| 5,159,600 A | * | 10/1992 | Chintapalli et al. | 714/738 |
| 5,542,043 A | * | 7/1996 | Cohen et al. | 714/32 |
| 5,724,273 A | * | 3/1998 | Desgrousilliers et al. | 702/120 |
| 6,219,829 B1 | * | 4/2001 | Sivakumar et al. | 717/131 |
| 6,279,124 B1 | * | 8/2001 | Brouwer et al. | 714/38 |
| 6,505,342 B1 | * | 1/2003 | Hartmann et al. | 717/104 |

(Continued)

OTHER PUBLICATIONS

Appendix A (CA9-2001-0092US1).

(Continued)

*Primary Examiner*—Tuan Dam
*Assistant Examiner*—Isaac Tecklu
(74) *Attorney, Agent, or Firm*—Duke W. Yee; Jeffrey S. LaBaw; Wayne P. Bailey

(57) ABSTRACT

Embodiments of the invention include a test case that is encapsulated defining its relationship with other such encapsulated test cases. An encapsulated test case may be explicitly associated with one or more parent test cases. Additionally, or alternatively, a test case embodying aspects of the present invention may be explicitly associated with one or more child test cases. Through such explicit relationships between test cases a complex hierarchical structure of test cases can be quickly and efficiently created. Further aspects of the invention, which may be incorporated in some embodiments, include an encapsulated test case which, when associated with other encapsulated test case, results in an explicit tree-like hierarchical structure of test cases being defined. In further embodiments of the present invention, a test case (encapsulated or conventional) may be associated with a test case association property. The test case association property explicitly defines the relationship between a parent test case and a child test case. That is, the test case association property defines a bi-directional (i.e., two way) association between a parent and child test case. In one embodiment, the test case association property is embodied in an object (such as, for example, a JAVA language object). In this embodiment, a selected test case may be associated with one or more test case association property objects wherein each test case association property object describes the relationship for only one parent test of the selected test case and the relationship for only child test case of the selected test case.

14 Claims, 8 Drawing Sheets

U.S. PATENT DOCUMENTS

| | | | |
|---|---|---|---|
| 6,601,233 B1 * | 7/2003 | Underwood | 717/102 |
| 6,898,784 B1 * | 5/2005 | Kossatchev et al. | 717/126 |
| 6,986,125 B2 * | 1/2006 | Apuzzo et al. | 717/124 |
| 2003/0126517 A1 * | 7/2003 | Givoni et al. | 714/46 |

OTHER PUBLICATIONS

Appendix B (CA9-2001-0093US1)—Arbiter Facility.

* cited by examiner

ORGANIZATION OF TEST CASES

CROSS-REFERENCE TO RELATED APPLICATIONS

The present application is related to copending commonly assigned U.S. patent application Ser. No. 10/294,945 (Unknown), entitled: Testing Measurements and U.S. patent application Ser. No. 10/294,248 (Unknown), entitled: Testing Measurements, which are hereby incorporated by reference.

FIELD OF THE INVENTION

The present invention relates generally to the testing of computer applications and, more particularly, to test cases for testing computer applications, and the organization thereof.

BACKGROUND OF THE INVENTION

Most computer applications (hereinafter "applications") are very complex systems that, due to their complexity, require significant testing to ensure that the application will execute as desired.

To facilitate the testing of applications, test cases or test suites (essentially a collection of test cases) are designed, implemented and used to test a portion or the whole of an application (often referred to as the subject under test). In many applications, these test cases manipulate the external facade or interface of the subject under test. The results of these test cases are then analyzed and evaluated. As many applications are quite complex, several, sometimes hundreds, of test cases are used for the testing of a single application.

For example, a database application may need to be tested to determine whether data can be added to the database (this is the test case). A test script would need to be created to implement the test case. The exemplary test script could include several steps, instructions or processes to test this aspect of the application including: gaining access to update the database, transmitting the update request; receiving confirmation that the update request has been executed; reading from the database to determine if the data in the update request was stored successfully; and then logging off from the database.

The processes or steps within a test script are executed linearly. Interspersed amongst these steps are one or more verification points which are designed to gather data representative of the operation of the subject under test. A verification point, when inserted into the test script, will issue or output a binary value (usually a single bit of data—e.g., a boolean value) that indicates whether a step(s) with which the verification point is associated was successfully or unsuccessfully completed. The output of the test script execution, which includes the values output by the verification points, is typically stored in a test case execution log.

The verification points also enable testers to analyze the test case execution log to ascertain which processes in the test case failed and, thus, which portions of the subject under test need to be investigated to rectify any problems (i.e., solve any bugs in the application, if necessary).

As a result of the data output by the verification points, a test script execution will generate an output which indicates whether the application successfully or unsuccessfully performed the test case (the test output).

If a tester desires to vary the linearity of the execution model associated with the test script, then the test script is exposed by the testing tool and the tester manually modifies the test script (using, typically, a language proprietary to the testing tool being used). Unfortunately, this type of modification is not usually further supported by the testing tool. That is, the testing tool will execute the modifications and provide a mechanism to run and modify the test script, but the test tool does not provide any advanced tools which operate in conjunction with the modifications.

As a consequence of the ability to make manual modifications, many advanced testers use testing tools to create only a skeleton of a test script and add the "guts" or substance of the test script manually. This type of use leads to considerable costs for maintaining the test scripts.

Known to the inventors are testing tools which help users (e.g., developers, testers, etc.) create, track and manage the test scripts. These testing tools provide users with essentially two constructs: the test script; and the test suite. The test suite as noted above, is essentially a grouping of test scripts. The test suite does not actually test the application per se, but simply calls or invokes the individual test scripts which, as a group. form the test suite. This grouping of test scripts enables a test suite to provide testing of meaningfully larger set of tests which can be applied to the subject of under test. While these constructs or organization of test scripts have been, for the most part, satisfactory, these constructs are now presenting users with significant shortcomings. The inventors have noted that as the testing of ever more complex applications becomes more common, these constructs have difficulty in scaling (i.e., difficulty in the constructs' ability to serve a larger number of users or more complex applications without breaking down or requiring major changes in procedure) and providing the ability to efficiently create complex testing structures.

For example, present systems, to produce complex structures, users link previously created test scripts to create a test suite or copy portions of one or more existing test scripts to create a new test script (often through simple "cutting and pasting" operations). However, the inventors have noted this procedure of linking previously independent test scripts (or portions thereof) often results in important interdependencies between instructions that existed in the previously created test scripts (or portions thereof) that impact the outcome of the test being broken, lost or over looked by the user. Additionally, the inventors have also noted that interdependencies which impact the outcome of a test are often inadvertently or unknowingly created when test scripts (or portions thereof) are linked together. Handling these interdependencies to ensure that problems are not created to invalidate or detrimentally impact the outcome of the test require significant reliance on the skill, expertise, knowledge and diligence of an individual user.

In a further shortcoming, the present testing environment promotes the creation of subtly different copies of a test script (or portion thereof) to be created by different users. These slightly different copies, resulting from the manual modifications which are made, detrimentally impact the efficient testing of an application, the analysis of the test results and the identification of defects which require some form of remediation.

Accordingly, addressing, at least in part, some of the shortcomings described above is desired to improve the testing of computer applications is desired.

SUMMARY OF THE INVENTION

The present invention is directed to a testing measurement, and related methods, apparatus, systems and tools which address, at least in part, some the various described shortcomings.

Aspects of the invention include a test case that is encapsulated. Each encapsulated test case is able to explicitly define its relationship with other such encapsulated test cases. A single encapsulated test case may be explicitly associated with one or more parent test cases. Additionally, or alternatively, a test case embodying aspects of the present invention may be explicitly associated with one or more child test cases. Through such explicit relationships between test cases a complex hierarchical structure of test cases can be quickly and efficiently created. Moreover, the interdependencies between instructions within a single test script are not likely to be broken as a test case, in its entirety, will be used to form a larger or more complex test. In a further advantage, the interdependencies between encapsulated test cases will be explicitly defined and, therefore, exposed to a user resulting in fewer unknown or inadvertent interdependencies, which may have a detrimental impact on the ultimate test results) being created.

Further aspects of the invention, which may be incorporated in some embodiments, include an encapsulated test case which, when associated with other encapsulated test case, results in an explicit tree-like hierarchical structure of test cases being defined. Embodiments incorporating these aspects of the invention enable a many:many relationship between encapsulated test cases. That is, a single encapsulated test case may have many parent encapsulated test cases. Additionally, the same single encapsulated test case may have many children encapsulated test cases In a further aspect of the present invention, a test case (encapsulated or conventional) may be associated with a test case association property. The test case association property explicitly defines the relationship between a parent test case and a child test case. That is, the test case association property defines a bi-directional (i.e., two way) association between a parent and child test case. In one embodiment, the test case association property is embodied in an object (such as, for example, a JAVA language object). In this embodiment, a selected test case may be associated with one or more test case association property objects wherein each test case association property object describes the relationship for only one parent test of the selected test case and the relationship for only child test case of the selected test case.

In accordance with an aspect of the present invention there is provided a test script for testing a computer application or portion thereof, said test script comprising: one or more test cases, each of said one or more test cases comprising: means for referencing zero or more parent test cases; and means for referencing zero or more child test cases; whereby said one or more tests create a hierarchy of test cases.

In accordance with an aspect of the present invention there is provided a test script for testing a computer application or portion thereof, said test script comprising: one or more test cases, each of said one or more test cases comprising: parent associations expressing links between zero or more parent test cases; and child associations expressing links between zero or more child test cases; whereby said one or more tests create a hierarchy of test cases.

In accordance with an aspect of the present invention there is provided a test tool for creating test scripts, said created tests scripts for testing a computer application or portion thereof, said test tool creating a test script comprising: one or more test cases, each of said one or more test cases comprising: parent associations expressing links between zero or more parent test cases; and child associations expressing links between zero or more child test cases; whereby said one or more tests create a hierarchy of test cases.

In accordance with an aspect of the present invention there is provided a computer readable media storing data and instructions, said data and instructions when executed by a computer system adapt said computer system to generate a test script for testing a computer application or portion thereof, said test script comprising: said test script comprising: one or more test cases, each of said one or more test cases comprising: means for referencing zero or more parent test cases; and means for referencing zero or more child test cases; whereby said one or more tests create a hierarchy of test cases.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
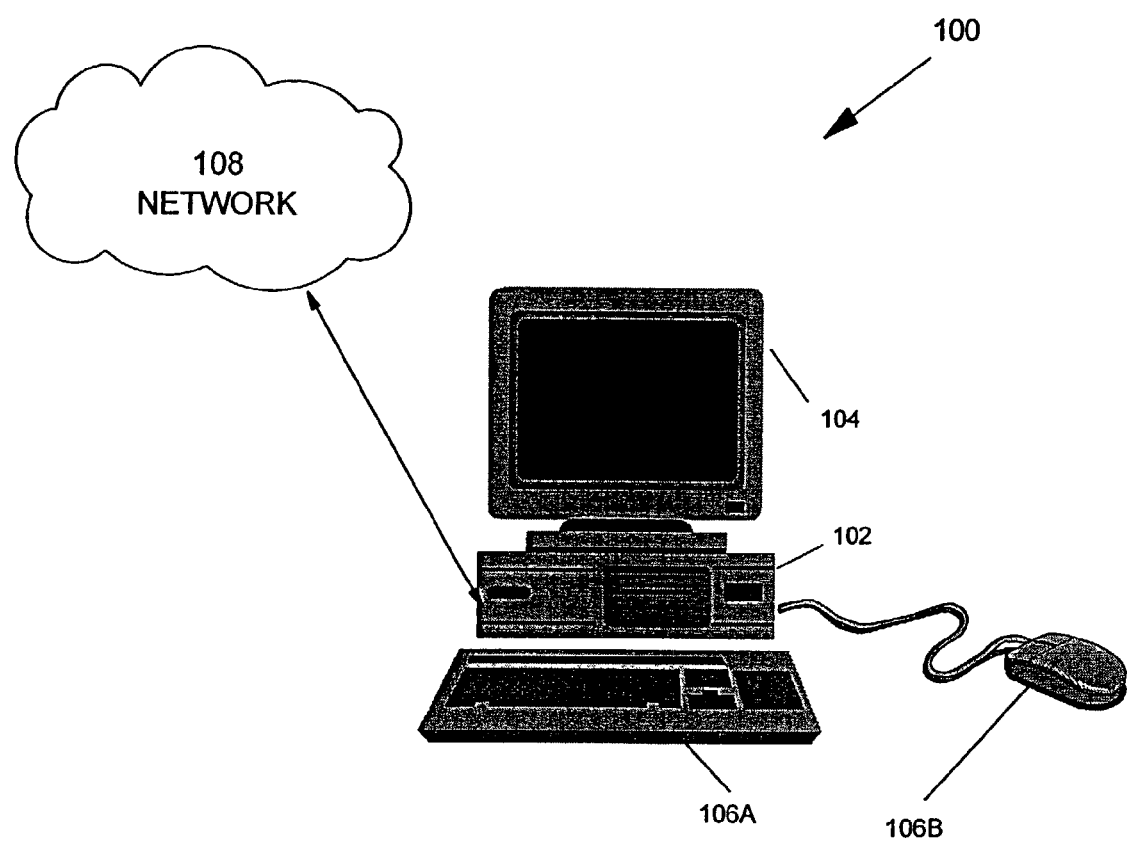
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 108. As will be appreciated by those of ordinary skill in the art, network 108 may be embodied using conventional networking technologies and may include one or more of the following: local area networks, wide area networks, intranets, public Internet and the like. Computer system 100 may interact with other networked computer systems (not shown) providing application testing and analysis of a distributed application.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 108. However, for ease of understanding, aspects of the invention have been embodied in a single computing device—computer system 100.

Computer system 100 includes processing system 102 which communicates with various input devices 106, output devices 104 and network 108. Input devices 106, two of which are shown, may include, for example, a keyboard 106A, a mouse 106B, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
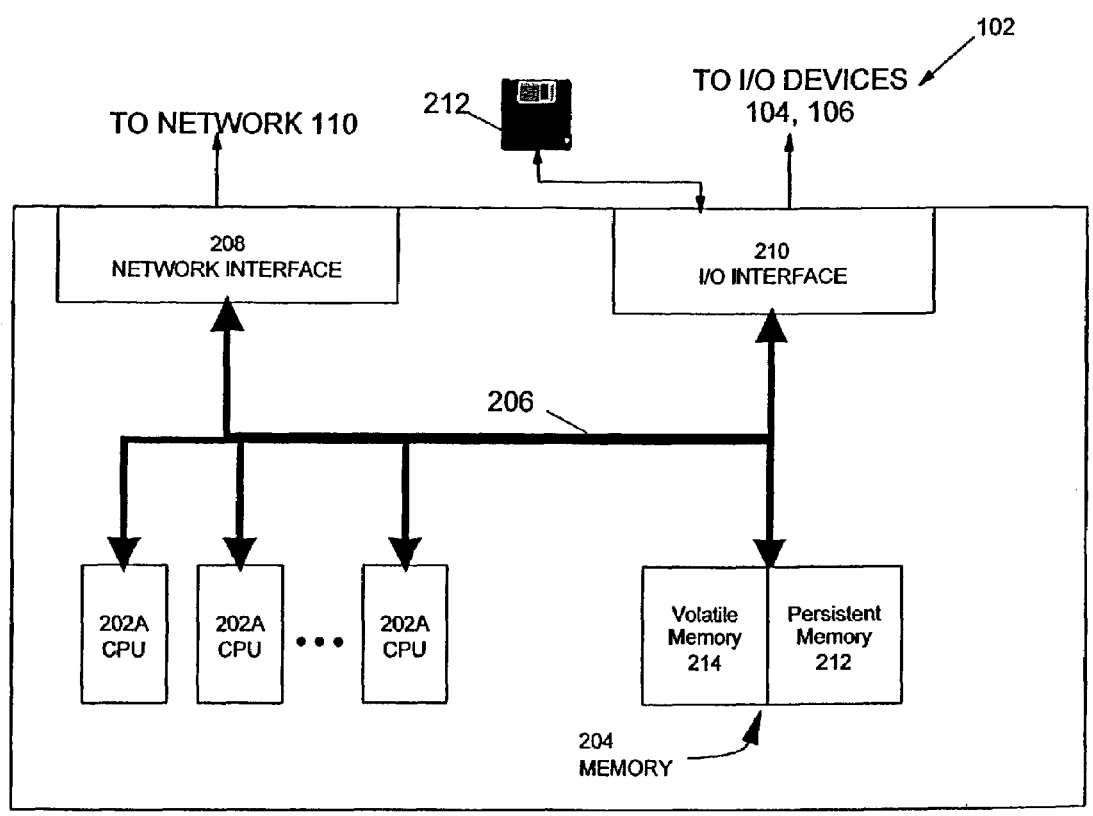
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 108. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 108.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
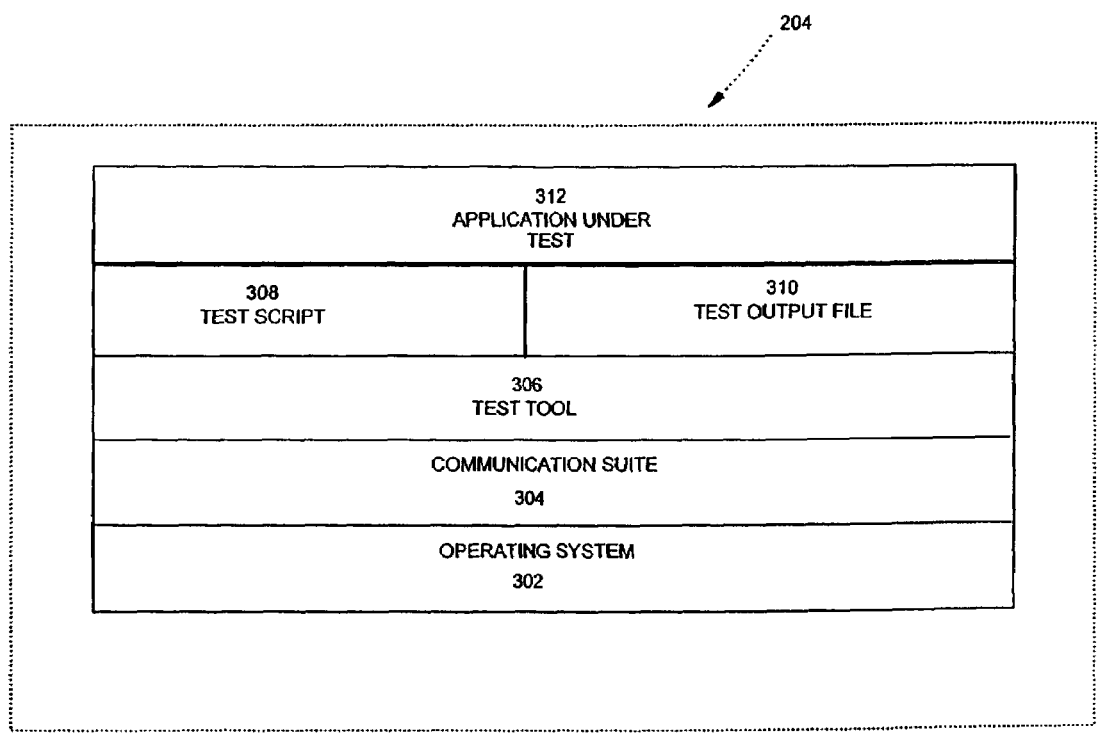
FIG. 3 illustrates, in functional block form, a portion of FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 202 stores operating system (OS) 302, communications suite 304, test tool 306, test script 308, test output file 310 and the application under test 312 (hereinafter "application 312").

OS 302 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 304 provides, through, interaction with OS 302 and network I/F 208 (FIG. 2), suitable communication protocols to enable communication with other networked computing devices via network 108 (FIG. 1). Communication suite 304 may include one or more of such protocols such as TCP/IP, ethernet, token ring and the like.

Test tool 306 is used by testers and developers to generate test scripts 308 which, when executed, test aspects of application 312 and generate test output file 310. Test tool 306 may be adapted from conventional or known test tools to perform the functions described herein. Test tool 306 may be used to: partially automate the entire testing process from generating test script 308; test application 312 using test script 308; and present the data in test output file 310 output by test script 308. Test tool 306 is used to generate test scripts which include the functionality of the arbiter facility described below.

Figure 4:
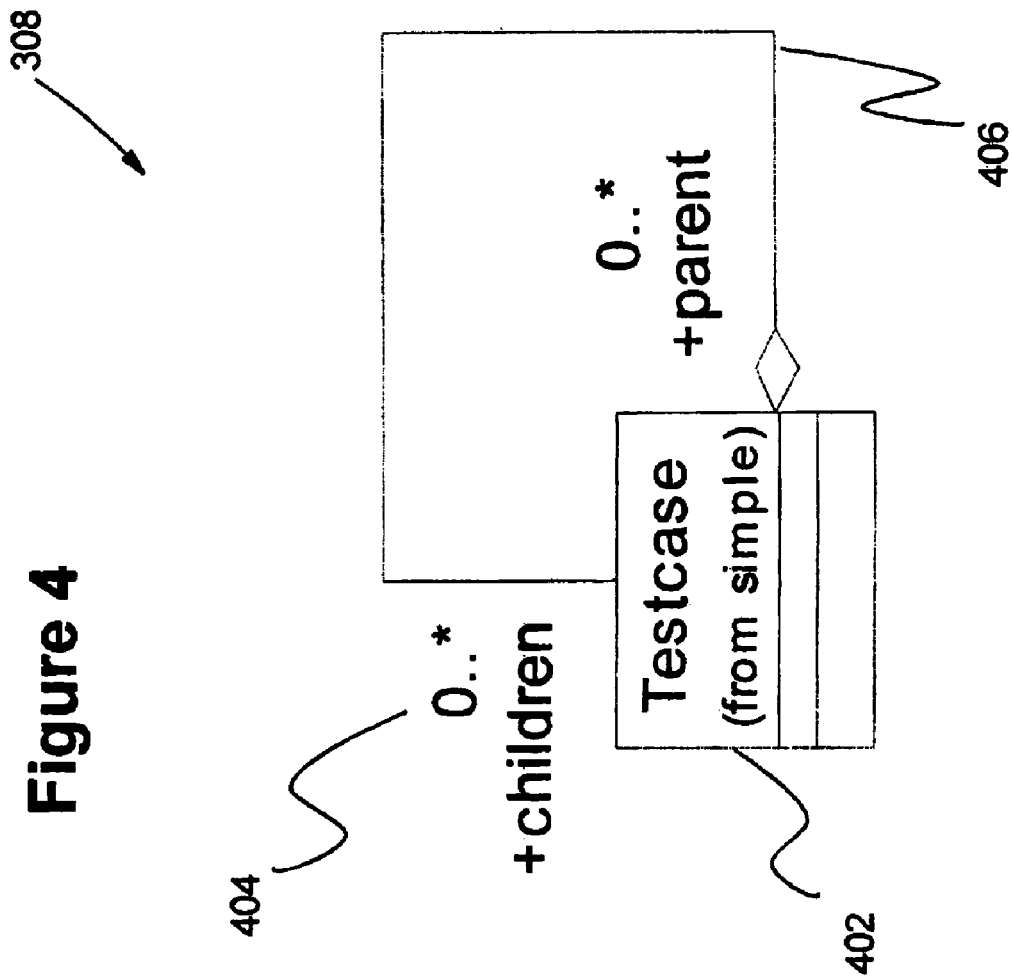
FIG. 4 illustrates, in a Uniform Modeling Language (UML) model, a first embodiment of the present invention including a single encapsulated test case and any relationships which may exist with other encapsulated test cases which may form part of the test of FIG. 3.

A first embodiment of test script 308 is modeled, using the notation of the Uniform Modeling Language (UML), in FIG. 4. Such a model is easily implemented, by those of ordinary skill in the art, using known object oriented computer languages such as JAVA, C++ or the like. While it will be appreciated by those of ordinary skill in the art that other languages and other language types (e.g., structured computer languages) could also be used to implement the model of test script 308 illustrated in FIG. 4, implementing the present invention using an object oriented language is expected to be preferred in most environments.

As illustrated in FIG. 4, the first embodiment test script 308 includes one or more encapsulated test cases 402 which may have zero or more children encapsulated test cases 402 (indicated by the "0. . * +children" notation 404) and zero or more parent encapsulated test cases 402 (indicated by the "0. . * +parent" notation 406).

Each encapsulated test case 402 in the present embodiment includes one or more instructions (or calls to one or more instructions); one or more verification points and, responsive to the execution of the instruction(s) and verification point(s), encapsulated test case 402 will output a test case result or output which will form part of test output file 310. An encapsulated test case 402 also includes a description of, or reference to, each of the encapsulated test case children (described by child notation 404) and a description of, or reference to, each of the encapsulated test case parents (described by parent notation 406).

The instructions included in, or called by, encapsulated test case 402 (not illustrated) are the various instructions or processes that are executed in order to test application 312. These instructions may include, for example, transmitting data used as input to a user interface of application 312, issuing commands to application 312 and the like.

Embedded within, or called by encapsulated test case 402 are one or more verification points (not illustrated) each of which is used to assess the performance of one or more instructions. A single verification point may be associated with one or more instructions. Additionally, a single verification may generate an output based on one or more inputs. An input into a single verification point may be a binary or non-binary value which the verification point uses to generate an output indicative of the relative success of the process(es) with which the verification point is associated. The verification points included or called by encapsulated test case 402 may be conventional in that the verification point will output a boolean value (SUCCESS or FAIL; TRUE or FALSE; etc.) or a verification point which may output a non-boolean value or a plurality of values such as those verification points described in the co-pending application filed Dec. 20, 2001 entitled "Testing Measurements" (IBM docket number CA9-2001-0092) having the same inventors as the instant application and assigned to the same assignee and which is hereby incorporated herein by reference or attached hereto as Appendix A.

The output of an encapsulated test case 402 may be generated by conventionally analyzing the results generated by the included verification point(s) (i.e., "AND"ing together the boolean data received from the executed verification point(s)) or by using a different rule or formula defined by an arbiter facility. Such an arbiter facility is described in the co-pending application having the same inventors as the instant application and assigned to the same assignee also entitled "Testing Measurements" (IBM docket number CA9-2001-0093), filed Dec. 20, 2001 and which is hereby incorporated herein by reference or attached hereto as Appendix B.

Executing a test script 308 will result in the execution or invocation of one or more encapsulated test cases 402 and will test application 312 (FIG. 3), or a portion thereof, and will output results in output file 310.

As noted above, an encapsulated test case 402 will include descriptions of, or references to, each of the parents and/or children of the encapsulated test case. Such a description may be in the form of a linked list, use unique identifiers or means for providing many:many associations known to those of ordinary skill in the art. Using these descriptions of, or references to, other encapsulated test cases, a graphical hierarchy of the test cases within the test script can be created and provided to a user. Such a graphical display can then be navigated so that details of one or more test cases can be ascertained. As will be appreciated, the reference to zero or more parents and zero of more children enables a test script to be created which has a many:many type relationship structure. That is, a single encapsulated test case 402 may have many parent test cases. Additionally, the same encapsulated test case may have many child test cases.

As a result of implementing the model of a test script illustrated in FIG. 4, a complex test script 308 can be created from relatively simple encapsulated test cases. Moreover, by simple modification of the references to other test cases within an encapsulated test case 402, the hierarchy of test script 308 can be quickly and easily modified. Moreover, the explicit expression of the relationship between test cases 402 reduces the likelihood that unintended interdependencies between test cases will be created. Moreover, implementation of the structure provided by the model illustrated in FIG. 4 promotes the reuse of encapsulated test cases 402 thereby reducing errors or other detrimental consequences resulting from the "cut and paste" operations promoted by current test script tools. In a further advantage, the construct of test suite (which does not provide any function other than linking existing test scripts together) is eliminated thus simplifying the model for creating a test for an application. Thus, test tools 306 which are adapted to interpret, construct and navigate about a single encapsulated test case 402 are similarly adapted to interpret, construct and navigate a complex test created from a plurality of interrelated encapsulated test case 402.

The inventors have noted that implementing the model illustrated in FIG. 4 is often sufficient for relatively simple test scripts 308 or for complex test scripts for relatively simple applications. However, implementations of the model of FIG. 4 encounter some difficulties for extremely complex applications that require similarly complex test scripts 308 (e.g., some scalability difficulties, difficulties related to the maintenance and reuse of test cases). Accordingly, a second embodiment of test script 308 is illustrated in UML modeling notation in FIG. 5 which addresses, at least in part, this shortcoming.

The second embodiment of test script 308 (designated and hereinafter referenced as "test script 308'") includes a parent test case 414 (which, in the exemplary embodiment, is an instance of a Testcase class) which may have zero or more child encapsulated test cases 402 (also an instance of a Testcase class, in the exemplary embodiment). For each parent-child association there exists a description of this test case association property which is illustrated by test case association 408 (implemented, in the exemplary embodiment, by instances of the TestcaseAssociation class). Each test case association 408 describes or defines the relationship between a child test case 402 and a parent test 414. That is, test case association 408 defines a two way (i.e. bi-directional) association between a parent test case 402/414 and a child test 402. A single instance of a test case association will describe the relationship for only one child test case 402 (indicated by child notation 404) and only one parent test case 414 (indicated by parent notation 412).

However as indicated by child association notation 410, a parent test case 414 may be associated with zero or more child test cases. Similarly, a child test case may be associated with zero or more parent test cases 414 (indicated by parent association notation 406). As will be appreciated by those of ordinary skill in the art, if a child test case 402 has no parent, then such a child test case is, in fact, the root of the tree of test cases 402 which comprise test script 308.

Figure 5:
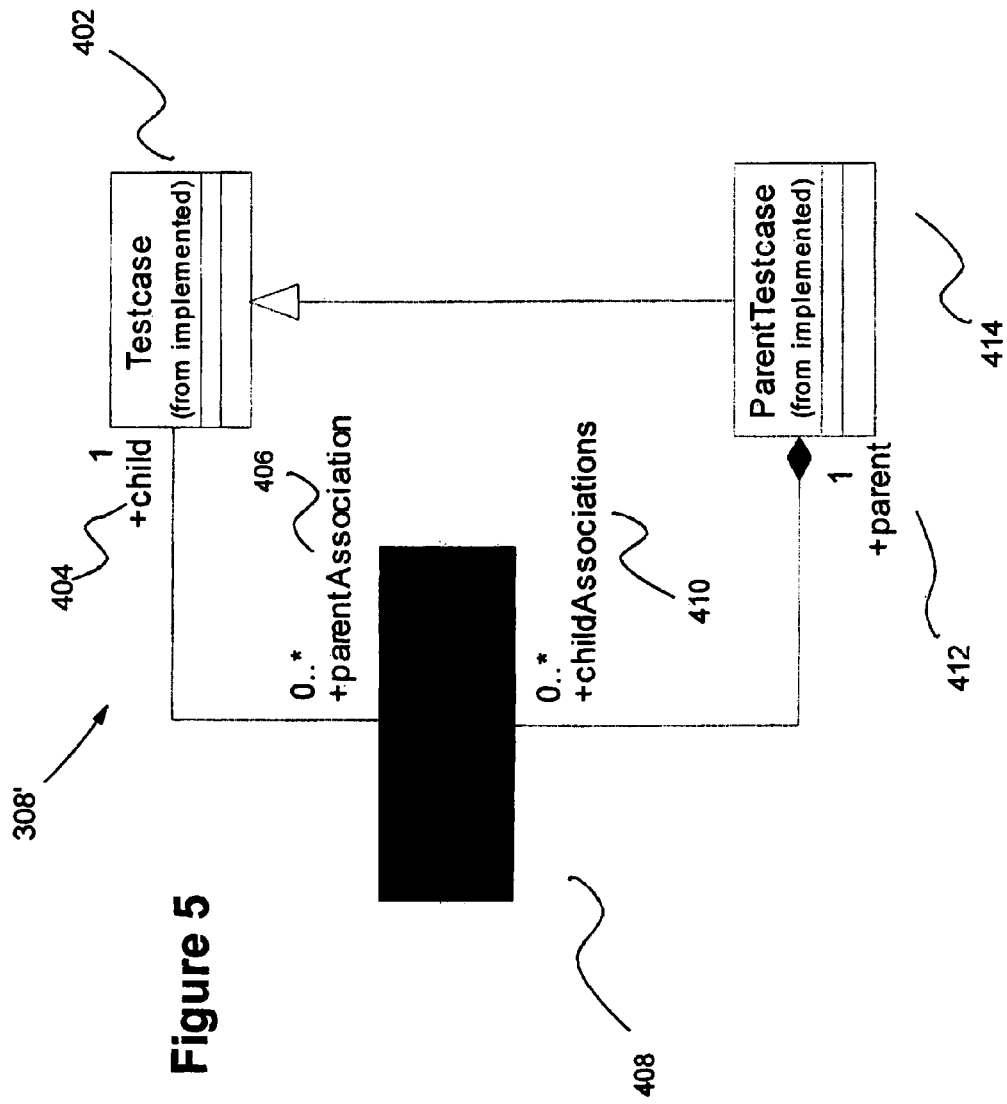
FIG. 5 illustrates, in a UML model, a second embodiment of the present invention including a single encapsulated test case and any relationships which may exist with other encapsulated test cases which may form part of the test of FIG. 3.

The model of test script 308' illustrated in FIG. 5, when implemented in a computer language, lends itself to the creation of tree-like hierarchy that can be easily represented in a graphic (which can be displayed on computer system 100 by test tool 306). Moreover, by interpreting a test case association 408 (which defines or describes only one parent test case 414 and only one child test case 402), navigation of or through the tree-like hierarchy is simplified.

As noted above, a single parent test case 414 may be associated "m" child test cases 402 (where "m" is greater than, or equal to 0—i.e., $m \geq 0$; and indicated by child association notation 410). As a result, each parent test case 414 will have such associations defined or described by "n" test case associations 408 (where "n" is greater than, or equal to, "m"—i.e., $m \geq n$). In many implementations of test script 308' modeled in FIG. 5, a child test case 402 is associated only once with a selected parent test case 414. In such an instance "m" would be equal to "n" since only a single test case association 408 is required to describe such an association. However, as is described below, it may be desirable to associate a single parent test case 414 with a single child test case 402 multiple times. In such a situation there would exist a greater number of associations ("n") then number of child test cases ("m").

A single child test case 402 may be associated with "i" parent test cases 414 (where "i" is greater than, or equal to 0—i.e., i≧0; and indicated by parent association notation 406). As a result, each parent test case 414 will have such associations defined or described by "j" test case associations 408 (where "j" is greater than, or equal to, "i"—i.e., j≧i). In many implementations of test script 308' modeled in FIG. 5, a child test case 402 is associated only once with a selected parent test case 414. In such an instance "i" would be equal to "j" since only a single test case association 408 is required to describe such an association. However, as is described below, it may be desirable to associate a single child test case 402 with a single parent test case 414 multiple times. In such a situation there would exist a greater number of associations ("j") then number of parent test cases ("i").

When test script 308' (modeled in FIG. 5) is implemented in the JAVA language, the implementation of test case association 408 defines both the association between a single child test case 402 and a single parent-test case 414 and the behavior for the flow of execution of test cases 402. That is, a test case association 408 is used to control the flow of execution of the test cases 402 which comprise test script 308. A block representation of the implementation of test script 308' is illustrated in FIGS. 7 and 8, while a functional representation is illustrated in FIG. 6 for ease of understanding.

Figure 6:
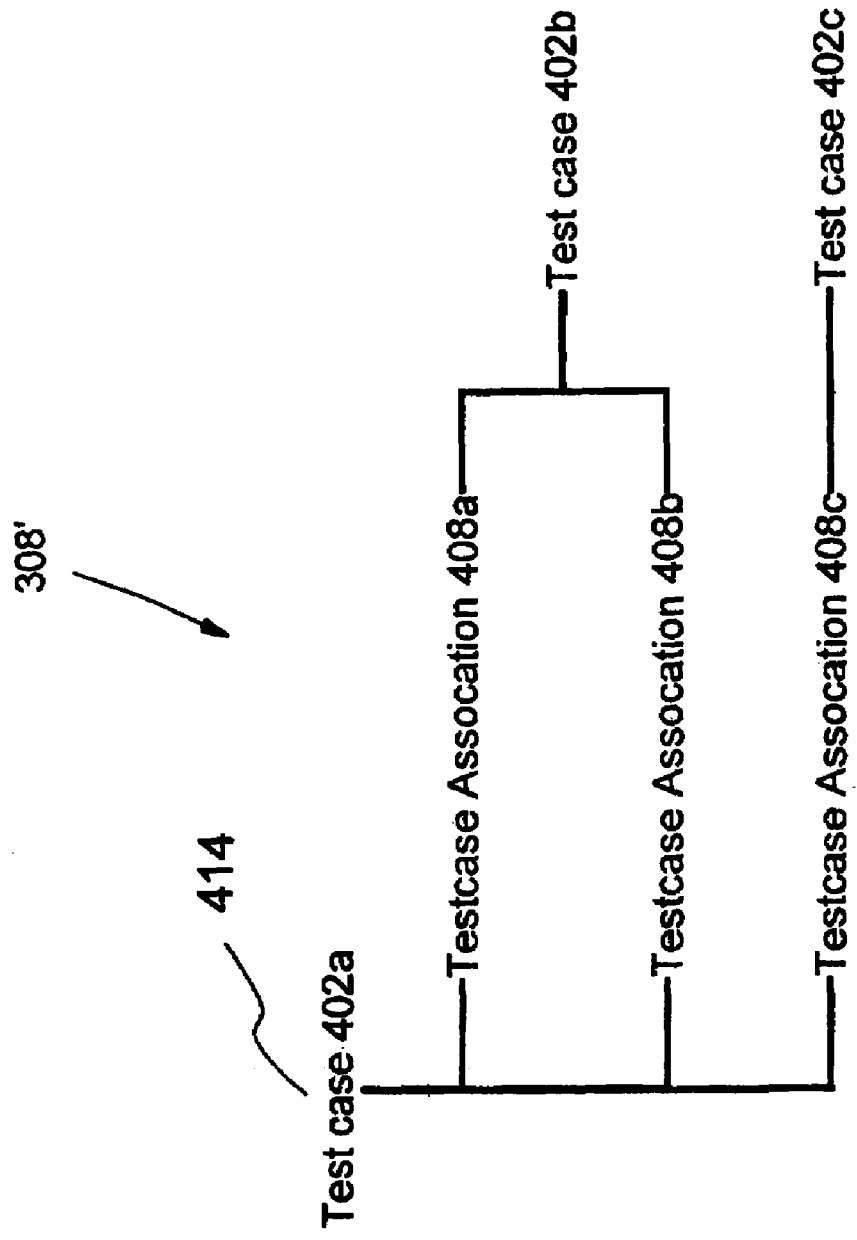
FIG. 6 illustrates an exemplary hierarchy that may be created using the embodiment of the present invention illustrated in FIG. 6.

As illustrated in FIG. 6, three test cases 402a, 402b, and 402c comprise test script 308'. Test case 402a is the only parent test case and, consequently, is also designated parent test case 414. Test cases 402b and 402c are children of parent test case 402a/414. As noted above, for each child-parent association there must be at least one (although there may be more than one) test case associations 408. As there are two child-parent associations (402b-402a and 402c-402b), there must be at least two test case associations 408. However, there are three such test case associations illustrated—408a, 408b and 408c. The additional test case association 408b defines an additional association between parent test case 402a and child test case 402b (that is, there are two associations described between child test case 402b and parent test case 402a). Such multiple test case associations 408 between a single selected parent test case 402a and a single selected child test case 402b may be desirable when such test case associations also describe the behavior for the flow or control of execution of test cases 402. For example, assume that each test case 402 in illustrated in FIG. 6 returns a boolean value (SUCCESS or FAIL). Also assume that it is desired that two test scripts 308 be created. It is desired that the first test script first execute test case 402a followed by test case 402b. If test case 402b reports "FAIL" then the first test script is to cease execution. If test case 402b reports "SUCCESS" then test case 402c is executed. The second test script is the same as the first with the exception that test case 402c is to be executed regardless of the success or failure of test case 402b. In the embodiment illustrated in FIG. 6, rather than create two different test scripts which only differ slightly, the same test cases are reused (thus reducing the likelihood of errors in creating a second test script) with changes only made in a test case association 408 modeling this control of test case execution. As such, test case association 408a implements the first situation (cease execution of test script 308' if test case 402b reports FAIL, otherwise execute test case 408c if test case 408b reports SUCCESS) while test case association 408b is used to implement the second test situation (always execute test case 402c after test case 402b regardless of the result reported by test case 402b)

Figure 7:
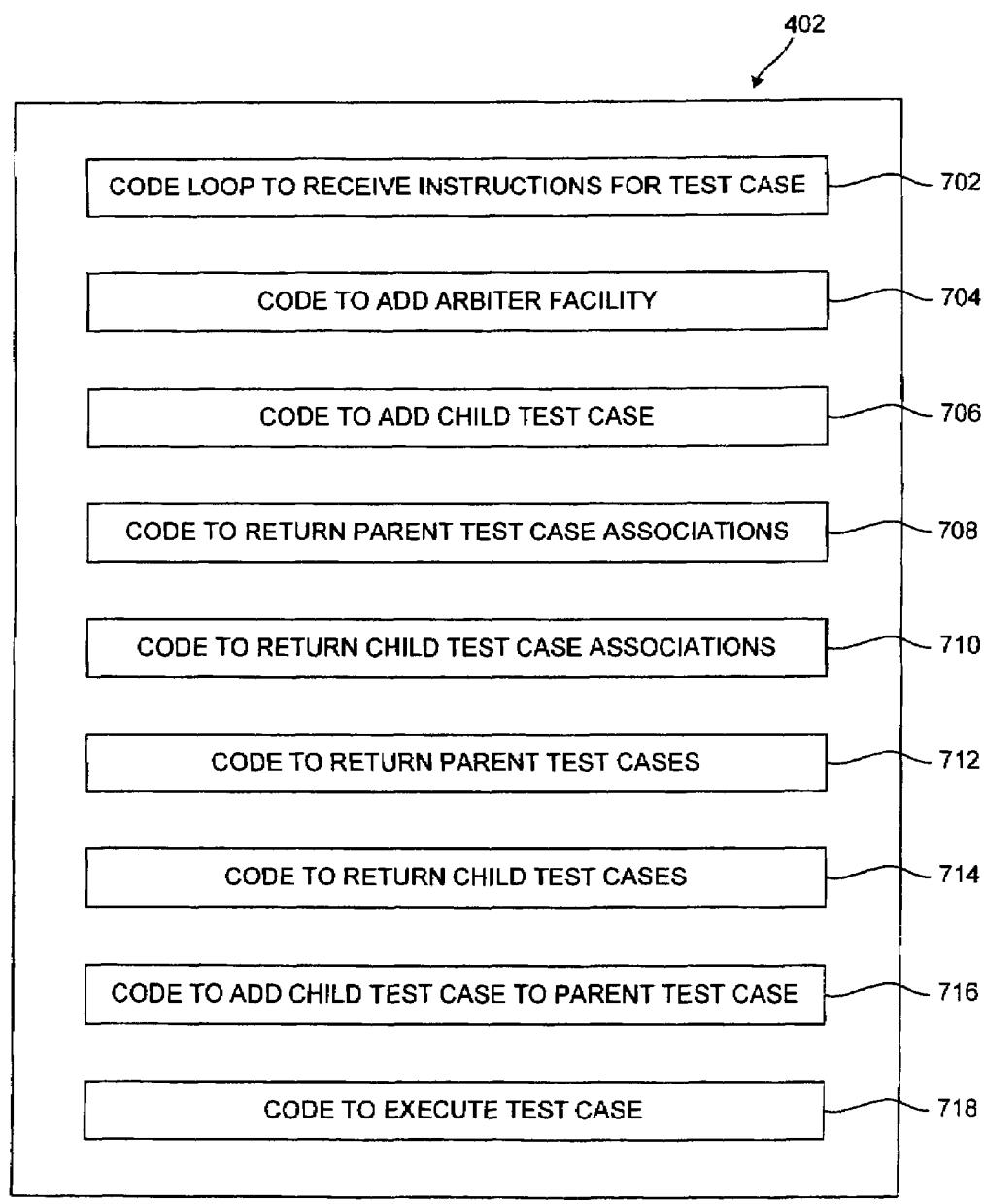
FIG. 7 illustrates a first source code file of an embodiment of the second embodiment of the present invention illustrated in FIG. 6.
Figure 8:
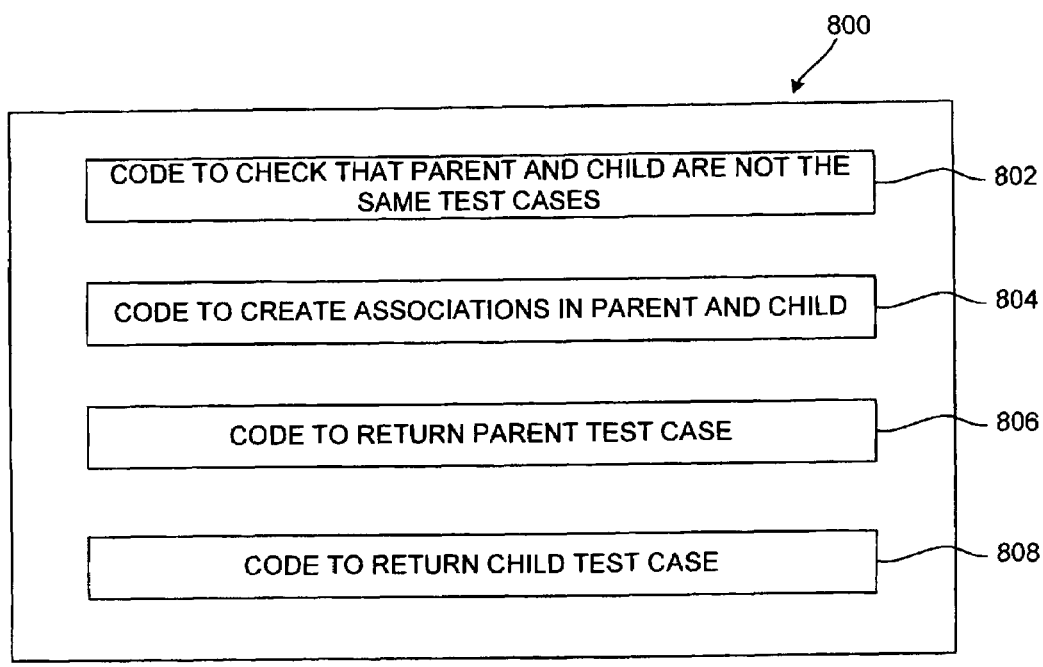
FIG. 8 illustrates a second source code file of an embodiment of the second embodiment of the present invention illustrated in FIG. 6.

Referencing FIG. 7, a block diagram of the coding for test case 402 is illustrated. Test case 402 invokes the methods of the embodiment of the test case association 408 illustrated in FIG. 8.

The test case 402 embodiment illustrated in FIG. 7 includes a loop 702 wherein each instruction which is to form part of the test case, is added to the test case 402 when the test case is instantiated. Additionally, an arbiter facility is added to the test case 402 by code portion 704. An arbiter facility, in part, explicitly expresses rules to be used to value the results returned by one or more verification points. The data type "Vector" provides details relating to the associations (parent or child) of a particular test case. For example, assume there exist three test cases 402—T1, T2 and T3. Further assume that the following hierarchy is created: T3 is a parent of T2 and T1; and T2 is parent of T1. Accordingly, there exists a test case association 408 between: T3 and T2 (referenced as "TA32"); T3 and T1 (TA31); T2 and T1 (TA21). Accordingly, the data type "Vector" will provide details of this hierarchy in the following manner:

T3.parentAssociations has 0 elements (i.e., no parent test cases);
T3.childAssociations has 2 elements: TA32, TA31;
T2.parentAssociations has 1 element: TA32;
T2.childAssociations has 1 element: TA21;
T1.parentAssociations has 2 elements: TA31, TA21; and
T1.childAssociations has 0 elements (i.e., no child test cases 402).

Code portions 706, 708, 710, 712 and 714 are used to create and navigate a test script 308'. Code portion 706 provides a method ("addChild") which is invoked by test tool 306 when a test case 402 is being added as a child to another test case 402 such as the one illustrated in FIG. 7. The addChild method invokes instantiates a new object of the TestcaseAssociation class (illustrated in FIG. 8) providing as arguments the child test case object and the object illustrated in FIG. 7 as the parent test case object.

Code portions 708 and 710 provide methods to return all of the parent test case associations 406 and all of the child test case associations 410 from the test case associations 408 associated with the selected test case 402, respectively. These methods are used by test tool 306 to assist in the creation of a hierarchical visual representation of test script 308'. Additionally, these associations are used to control the flow of execution of test script 308'.

Code portions 712 and 714 provide methods to return all of the parent test cases 414 and all of the child test cases 402 associated with the selected test 402. These methods are used by test tool 306 to assist in the creation of a hierarchical visual representation of test script 308'. Additionally, the methods are used during execution of test case 402 to execute the entirety of the test script 308'.

Code portion 716 provides a method that allows adding of a child test case 402 to a parent test case 402/414.

Code portion 718 is invoked to execute the test case 402 illustrated in FIG. 7. Code portion 718 additionally provides for control of execution of some of the test cases 402 which together comprise test script 308'. An exemplary test case 402 will only allow execution of child test cases 402, if the arbiter facility of parent test case 414 returned a boolean value indicating the parent test case was successfully indicated. If the parent test case 414 was successfully executed, each of the child test cases associated the illustrated test case will be executed through the use of loop. In at least one implementation, code portion 718 provides that after the execution of the test case instructions—executeTC( ) method—the child test cases are executed in the same order that the child test cases were added to the parent.

As will be appreciated other controls for the flow of execution could be alternatively implemented in code portion 718.

In one embodiment the TestcaseAssociation is responsible only for providing the "expected" or "default" behavior for a particular association. However, in alternative embodiments, additional flow control may be implemented in other portions of code which accesses the test case association's properties. In this additional piece of code the flow control can, for example, disregard the association information—using other logic—such as due to some abnormal output during execution of a test case execution.

Referencing FIG. 8, a block diagram of a class which implements the test case association 408 is illustrated. Code portion 802 invokes the TestcaseAssociation method, providing a parent test case 402/414 and a child test case 402 (FIG. 6), and results in a check being performed. The check is performed to ensure that parent and child test cases 414, 402 are not the same test case. If the parent and child test cases are found to be different test cases, then the association between the child and parent test cases is created by code portion 804 invoking the addChildTestcaseAssociation method in the parent test case 414 and the addParentTestcaseAssociation method in the child test case. Code portions 802 and 804 are used when a test case association 408 is created. A parent association is created in the child test case 402 and a child association is created with reference to the parent test case 402/414. Code portion 716 (FIG. 7) is used to create the "child to parent" addition.

Code portions 806 and 808 are used to navigate the hierarchy of test script 308. Code portion 806 returns the parent test case 414 in a selected test case association 408 while code portion 808 returns the child test case 402 in a selected test case association 408.

As will be appreciated by those of ordinary skill in the art, implementations of the model illustrated in FIG. 5 which differ from the implementation illustrated in FIGS. 7 and 8 are possible. For example, a different language (e.g., C++, SmallTalk, etc.) or the use of a non-object oriented language (e.g., C, VisualBasic, etc.) could also be used.

Persons of ordinary skill in the art will appreciate that embodiments of the invention described herein provide advantages over the known test tools, test scripts and test organizations. The invention described herein is particularly adapted to the creation of complex test scripts using and reusing simple test cases. Moreover, some embodiments of the invention are particularly adapted to a hierarchical visualization and navigation. Moreover, some embodiments of the present invention allow the associations between test cases to be explicitly expressed and, advantageously, such associations are easily modifiable and navigable. In a further advantage, test scripts and the test case components thereof are more easily managed and used. In a still further advantage, the model or constructs used for the testing of a computer application are simplified. In a still further advantage, some embodiments of the invention provide the ability to control the flow of execution of multiple test scripts using the same test case components through the simple alteration of the association between the component test cases. Other advantages will also be apparent to those of ordinary skill in the art.

As will be appreciated by those skilled in the art, modifications to the above-described embodiment can be made without departing from the essence of the invention.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A computer readable storage media containing data and instructions, said data and instructions when executed by a computer system adapt said computer system to generate a test script for testing a computer application or portion thereof, said test script comprising:
    a first test case and a second test case each having at least one embedded test command embedded therein that is executable to perform a test function on at least the portion of the computer application, wherein said second test case is a child test case inherited from said first test case, and wherein each of said first test case and said second test case comprising:
        (i) means for executing one or more instructions that interact with the computer application;
        (ii) means for generating and presenting a test case output responsive to results generated by one or more verification points associated with said one or more instructions;
        (iii) means for referencing a plurality of parent test cases; and
        (iv) means for referencing a plurality of child test cases;
    means for describing a two-way association between said first test case and said second test case, including means for modifying the flow of execution of said first test case and said second test case based on a first condition; and
    second means for describing a second two-way association between said first test case and said second test case, including second means for modifying the flow of execution of said first test case and second test case based on a second condition.

2. The computer readable storage media of claim 1 wherein said means for generating a test case output comprises an arbiter facility.

3. The computer readable storage media of claim 1 wherein each of said first test case and said second test case further comprises:
    means for creating an association with another test case having at least another embedded test command embedded therein that is executable to perform another test function on at least the portion of the computer application.

4. A computer system containing a test script for testing a computer application or portion thereof, said computer comprising:
    a memory containing said test script; and
    a processing unit connected to execute said test script;
    wherein said test script contains a first test case and a second test case each having at least one embedded test command embedded therein that is executable to perform a test function on at least the portion of the computer application, wherein said second test case is a child test case inherited from said first test case, and wherein each of said first test case and said second test case having:
- one or more executable instructions that, when executed, test at least the portion of the computer application,
- a test case output responsive to results generated by one or more verification points associated with said one or more executable instructions,
- parent associations expressing links with a plurality of parent test cases, and
- child associations expressing links with a plurality of child test cases;

a test case association property describing an association between said first test case and said second test case, including means for modifying the flow of execution of said first test case and said second test case based on a first condition; and a second test case association property describing a second association between said first test case and said second test case, including second means for modifying the flow of execution of said first test case and second test case based on a second condition.

5. The computer system of claim 4 wherein each of said first test case and said second test case further comprises:
means for creating an association with another test case having at least another embedded test command embedded therein that is executable to perform another test function on at least the portion of the computer application.

6. The computer system of claim 4 wherein said test case output comprises an arbiter facility.

7. A computer system containing a test tool for creating test scripts that test a computer application or portion thereof, said system comprising:
a memory containing said test script;
a processing unit connected to execute said test script;
wherein said test script contains a first test case and a second test case each having at least one embedded test command embedded therein that is executable to perform a test function on at least the portion of the computer application, wherein said second test case is a child test case inherited from said first test case, and wherein each of said first test case and said second test case having:
- one or more instructions for testing at least the portion of the computer application, a test case output responsive to results generated by one or more verification points associated with said one or more instructions, parent associations expressing links with a plurality of parent test cases, and child associations expressing links with a plurality of child test cases;

a first test case association property describing a first association between said first test case and said second test case, including means for modifying the flow of execution of said first test case and said second test case based on a first condition; and a second test case association property describing a second association between said first test case and said second test case, including second means for modifying the flow of execution of said first test case and second test case based on a second condition.

8. The computer system of claim 7 wherein each of said first test case and said second test case further comprises:
means for creating an association with another test case having at least another embedded test command embedded therein that is executable to perform another test function on at least the portion of the computer application.

9. The computer system of claim 7 further comprising a second test case association property describing a second association between said first test case and said second test case.

10. The computer system of claim 7 further comprising means to graphically represent a hierarchy of test cases that includes said first test case and said second test case using said parent and child associations.

11. The computer system of claim 10 further comprising means to navigate said graphically represented hierarchy.

12. A computer readable storage media containing data and instructions, said data and instructions when executed by a computer system adapt said computer system to generate a test script for testing a computer application or portion thereof said test script comprising:
a first test case and a second test case each having at least one embedded test command embedded therein that is executable to perform a test function on at least the portion of the computer application, wherein said second test case is a child test case inherited from said first test case, and wherein each of said first test case and said second test case comprising:
means for executing one or more instructions that interact with the computer application;
means for generating a test case output responsive to results generated by one or more verification points associated with said one or more instructions;
means for referencing a plurality of parent test cases; and
means for referencing a plurality of child test cases;
means for describing an association between said first test case and said second test case, including means for modifying the flow of execution of said first test case and said second test case based on a first condition; and
second means for describing a second association between said first test case and said second test case, including second means for modifying the flow of execution of said first test case and second test case based on a second condition.

13. The computer readable storage media of claim 12 wherein each of said first test case and said second test ease further comprises:
means for creating an association with another test case having at least another embedded test command embedded therein that is executable to perform another test function on at least the portion of the computer application.

14. The computer readable storage media of claim 13 wherein means for generating a test case output comprises an arbiter facility.

* * * * *